Patented Feb. 4, 1930

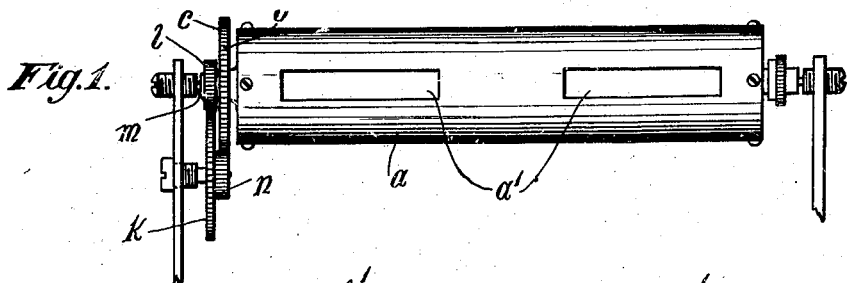
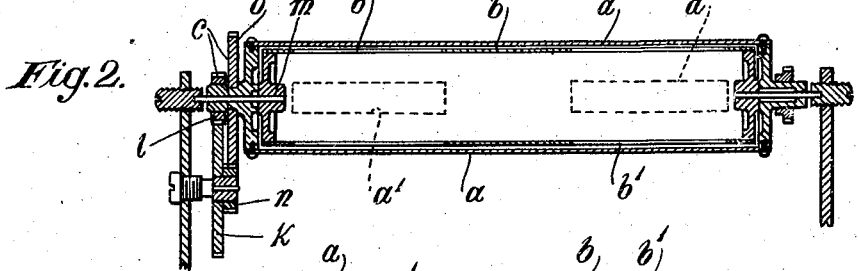
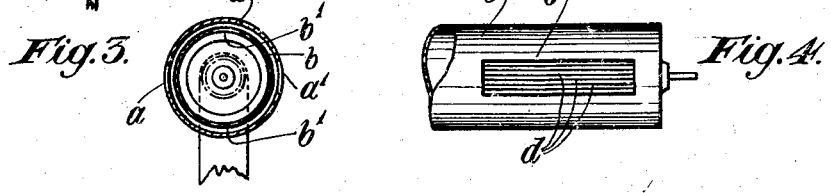
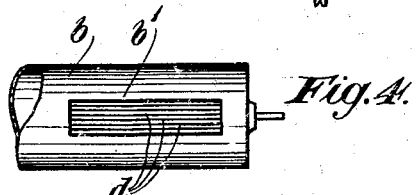

1,746,179

UNITED STATES PATENT OFFICE

ALBERT JASPER ASHDOWN, OF LETCHWORTH, ENGLAND

STROBOSCOPIC APPARATUS

Application filed May 28, 1927, Serial No. 195,095, and in Great Britain June 3, 1926.

My invention relates to stroboscopic apparatus, and has for its object to provide improvements in such apparatus which will enable an easy and accurate study of many phenomena in machine shop and like work, the nature of which previously has been largely a matter of assumption.

In existing stroboscopic apparatus, the shutter mechanism is such that the length of each period the object being viewed is under observation has at all times a constant unalterable relationship to the eclipse period. For example, if it is desired to obtain greater definition of the object being observed the operator would probably endeavour to shorten the time of each observation period by increasing the speed of the shutter. This however, will necessarily also reduce the time of the eclipse period to a proportional extent, whereas the observer would most probably want to reduce the observation period without altering the eclipse period. In fact it is found that the present forms of shutters have undesirable limitations because of the eclipse and observation periods being so intimately related that it is impossible to achieve the desideratum of exceedingly short observation periods in relation to the eclipse periods. This is due to the fact that the rate of travel of the apertured portion of the shutter mechanism is exactly the same as the part not apertured, whereas if one could arrange that the rate of travel or the speed factor of the one is different to the other, more particularly so as to ensure that for a given length of observation period and area of vision the frequency of observation was increased, one would obtain better results, and my invention is broadly characterized in that in stroboscopic apparatus the speed factor determining the frequency of observation is not the same as that which determined the length of time of each observation. In the preferred embodiment of my invention the speed of that part of the apparatus which determines the length of time of each observation is a suitable multiple such as nine times that of the part of the apparatus which determines the frequency of observation.

According to the preferred embodiment of my invention I employ instead of only one shutter, a pair of shutters arranged across the line of vision, both moving simultaneously and preferably in the same direction and the speed of one being greater than the speed of the other. I can employ for this purpose a pair of concentric sleeve-like shutters, both apertured so that all of the apertures can at intervals coincide on a common line of vision, the inner shutter however being rotated at an appreciably lesser speed than the outer shutter. In this event, the inner shutter would of course determine the frequency of observation, and the outer shutter would determine the length of time of each observation.

In order that the present invention can be clearly understood and readily carried into effect, I have appended hereto a sheet of drawings illustrating two embodiments of same, and wherein:—

Fig. 1 is an outside elevation of a shutter composed of two concentric cylinders or sleeves.

Fig. 2 is a longitudinal section.

Fig. 3 is a sectional end view.

Fig. 4 shows part of the inner shutter, and in which its apertures are compounded or divided into several narrow slits.

Referring to the drawings, two separate shutters are employed, one of which regulates the period or frequency of the vision whilst the other determines the duration of each periodic vision. For this purpose two shutters are rotated at different relative speeds, the slower moving shutter $a$ (Figs. 1 to 4) controlling the period or frequency of the vision whilst the second more rapidly moving shutter $b$ (Figs. 1 to 4) decides the duration of each periodic vision. These two shutters may be driven independently with separate speed controls or may be interconnected by suitable gearing so that they move at different relative speeds. A suitable form of gearing $c$ may be arranged between the shutters or between them and the driving means to enable any suitable combination of speeds to be obtained. The shutters $a$ and $b$ are cylindrical and adapted to rotate about a common axis preferably in the same direction, but if desired in the reverse directions.

The shutter $a$ is disposed concentrically outside the shutter $b$ and the shutters are provided with apertures $a^1$ and $b^1$ respectively, preferably of an elongated slot form situated opposite to each other. One shutter may be rotated through an electric motor or by hand or mechanical means either directly or through suitable gearing so that a suitable speed of rotation will be obtained to provide the desired period or frequency of vision for any particular object which may be under observation. The other shutter is driven in a similar manner either through a separate motor and gearing or by a geared connection to the first shutter at a higher speed as shown by the gearing $c$ in Figs. 1 and 2. The inner shutter $b$ controls the duration of each vision, and the outer shutter $a$ determines the frequency of vision. The vision of the object will occur each time the apertures $a^1$ in the outer and slower moving cylinder $a$ are opposite to each other on the line of vision and whilst at the same time the inner and more rapidly moving shutter $b$ is located so that its apertures $b^1$ travel across the apertures $a^1$ of the slower moving shutter $a$. The more rapidly moving shutter $b$ will of course continue to come into positions to give a vision of the object at times when the slower moving shutter is closed, thus preventing the object from being viewed at times other than those necessary to give the desired stationary or slow moving vision of the object under examination, that is to say twice every revolution of the outer shutter there will be a vision period, but each such vision period would only occur once during a number of revolutions of the inner shutter $b$. The relative high rate of movement of the inner shutter $b$ will ensure sharp definition of the object. If desired the slotted or other apertures in the cylinder $b$ and/or in the cylinder $a$ may be compounded or divided into a number of narrow apertures by means of longitudinal flat strips $d$ (see Fig. 4) arranged preferably parallel to the line of vision through the centre of the aperture. Whilst such an arrangement might apply to a limited extent to both shutters it is primarily intended for use in the inner shutter $b$ only and is adapted to give an exceedingly rapid opening and closing of the shutter with a comparatively large effective aperture thus enabling high definition to be obtained without excessive speeds.

The gearing $c$ can be driven from any suitable source, and the primary rotary member in each such gearing consists of a relatively large diameter wheel $k$ meshing with a small gear wheel $l$ fixed on the spindle $m$ of the inner cylinder $b$ to which the fast moving disc $e$ is secured, the wheel $k$ carrying with it a smaller gear wheel $n$ meshing with a gear wheel $o$ secured to the outer cylinder $a$.

I claim:—
1. Stroboscopic apparatus including a rotary cylindrical shutter, a second rotary cylindrical shutter concentric with said first shutter, diametrically opposed apertures in said first mentioned shutter, diametrically opposed apertures in said second mentioned shutter movable across said first mentioned apertures and means for driving said first and second shutters at different speeds.
2. Stroboscopic apparatus according to claim 1 including gearing operatively connected between said first and second shutters.

ALBERT JASPER ASHDOWN.